US009124366B2

(12) United States Patent
Horio et al.

(10) Patent No.: US 9,124,366 B2
(45) Date of Patent: Sep. 1, 2015

(54) COMMUNICATION APPARATUS, COMMUNICATION SYSTEM, CONTROL METHOD, AND STORAGE MEDIUM

(71) Applicant: CANON KABUSHIKI KAISHA, Tokyo (JP)

(72) Inventors: Daisuke Horio, Tokyo (JP); Norihito Aoki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 282 days.

(21) Appl. No.: 13/650,645

(22) Filed: Oct. 12, 2012

(65) Prior Publication Data

US 2013/0122820 A1    May 16, 2013

(30) Foreign Application Priority Data

Nov. 10, 2011   (JP) ................................. 2011-246859

(51) Int. Cl.
*H04M 1/00* (2006.01)
*H04B 17/364* (2015.01)

(52) U.S. Cl.
CPC .................................. *H04B 17/364* (2015.01)

(58) Field of Classification Search
CPC ......... H01Q 25/00; H01Q 3/30; H01Q 19/30; H04B 7/0617; H04B 17/0047; H04B 7/0408; G01S 1/02; H04W 16/28
USPC ........... 455/550.1, 670.11, 502, 556.1, 556.2, 455/575.7, 67.11, 115.1, 73; 343/757, 824, 343/893; 342/359, 367, 369, 371
See application file for complete search history.

(56) References Cited

U.S. PATENT DOCUMENTS

| | | | |
|---|---|---|---|
| 8,290,443 B2* | 10/2012 | Stirling-Gallacher et al. ........................ 455/67.13 |
| 8,442,443 B2* | 5/2013 | Stirling-Gallacher et al. ........................ 455/63.1 |
| 8,472,879 B2* | 6/2013 | Hane et al. .................... 455/63.4 |
| 2001/0048389 A1* | 12/2001 | Nakagawa .................... 342/378 |
| 2010/0330906 A1* | 12/2010 | Aoki ............................ 455/41.1 |
| 2011/0063168 A1* | 3/2011 | Skarp ............................ 342/359 |
| 2012/0220238 A1* | 8/2012 | Hosoya et al. ............... 455/63.4 |
| 2012/0220239 A1* | 8/2012 | Hosoya et al. ............... 455/63.4 |
| 2013/0231058 A1* | 9/2013 | Ramachandran et al. ... 455/63.4 |
| 2013/0231059 A1* | 9/2013 | Prasad et al. ................. 455/63.4 |
| 2014/0057570 A1* | 2/2014 | Leiba ............................ 455/63.4 |
| 2014/0057668 A1* | 2/2014 | Kimura et al. ................ 455/501 |

FOREIGN PATENT DOCUMENTS

| | | |
|---|---|---|
| JP | 11-266180 A | 9/1999 |
| JP | 2001-345747 A | 12/2001 |
| JP | 2002-531993 A | 9/2002 |
| JP | 2003-283404 A | 10/2003 |

OTHER PUBLICATIONS

JP Application No. 2011-246859—Office Action dated Jun. 12, 2015.

* cited by examiner

*Primary Examiner* — Edward Urban
*Assistant Examiner* — Max Mathew
(74) *Attorney, Agent, or Firm* — Fitzpatrick, Cella, Harper & Scinto

(57) ABSTRACT

A communication apparatus acquires a delay profile for a first transmit signal from a transmitting apparatus and determines an end time at which to end detection of a second transmit signal from the transmitting apparatus, based on the delay profile.

11 Claims, 14 Drawing Sheets

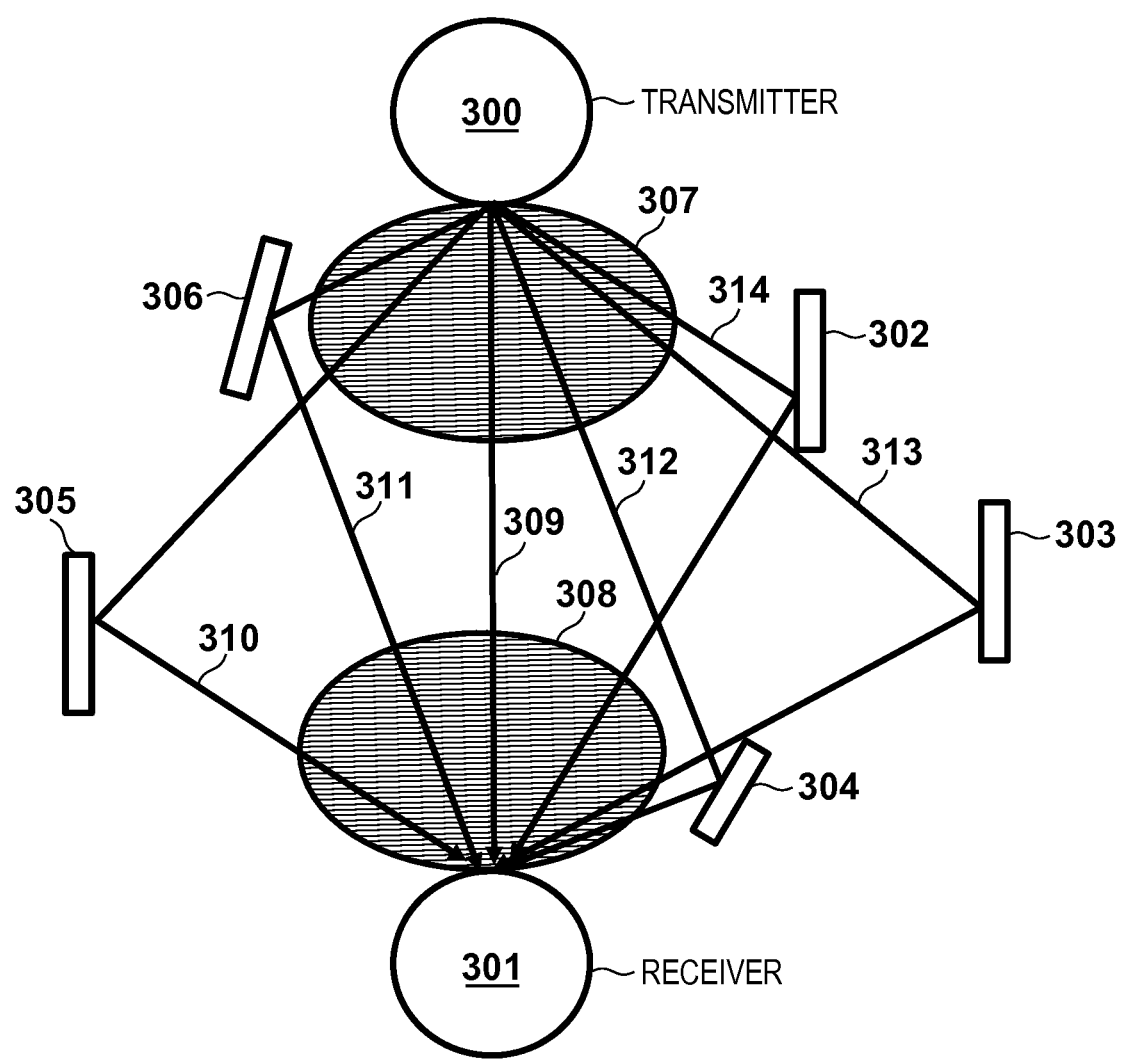
F I G. 3

F I G. 12B
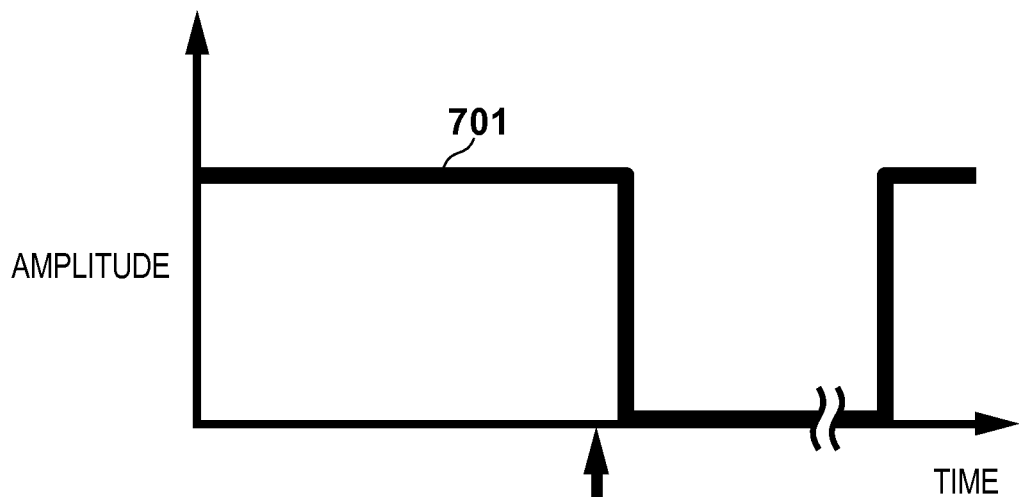
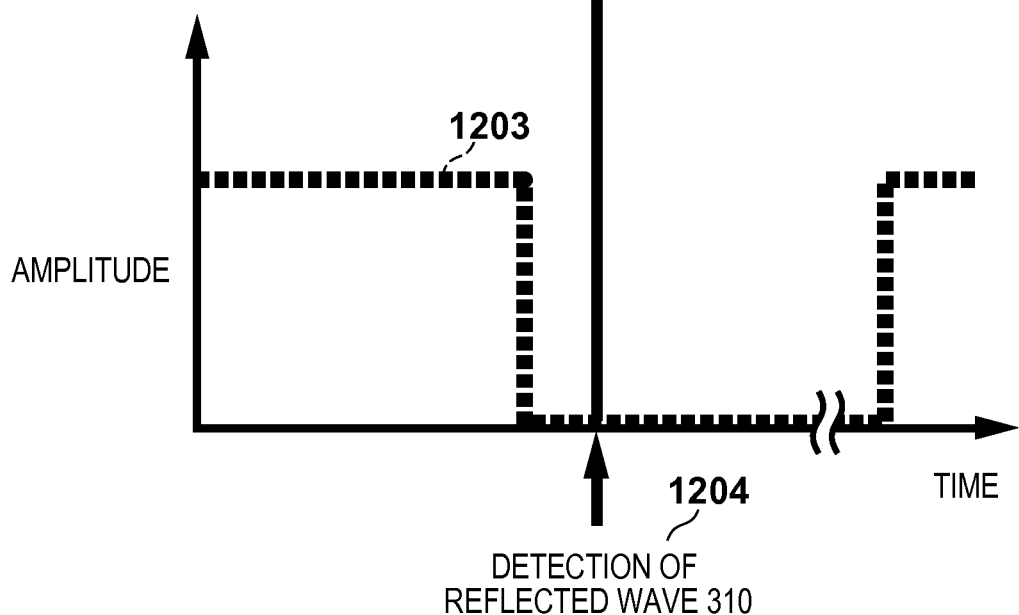

COMMUNICATION APPARATUS, COMMUNICATION SYSTEM, CONTROL METHOD, AND STORAGE MEDIUM

BACKGROUND OF THE INVENTION

1. Field of the Invention

The present invention relates to a communication apparatus that executes a directivity angle search for determining antenna directivity characteristics suitable for communication, a communication system, a control method, and a storage medium.

2. Description of the Related Art

In recent years, there has been increasing demand for high-speed and real-time data communication for, for example, transmission of uncompressed high-definition moving image data or the like. To deal with this demand, a communication system using high frequency bands including millimeter wavebands is gathering attention. Because the millimeter wavebands have shorter wavelengths than the frequency bands for 2.4- and 5-GHz wireless LAN compliant with IEEE 802.11, attenuation of radio waves due to radio-wave propagation readily increases. Thus, in order to secure a sufficiently long communicable distance, a communication system using antennas such as array antennas that have variable directivity characteristics has been proposed (IEEE 802.15.3c-2009). In order to enable transmitter-receiver communication using antennas having variable directivity characteristics, it is necessary for the transmitter and the receiver to determine the directions of arrival of direct waves and reflected waves.

IEEE 802.15.3c-2009 describes a technique for specifying the direction of arrival of radio waves by beforehand providing a period for determining directivity characteristics to be used in communication between a transmitter and a receiver and scanning the antenna directivity characteristics of the receiver for each antenna directivity characteristic of the transmitter. Hereinafter, this technique is referred to as a "directivity angle search". By performing a directivity angle search, transmission/reception directivity characteristics that enable radio wave reception at the desired reception quality can be determined, and a plurality of those directivity characteristics can be stored as communication path information and used in subsequent data communication.

Japanese Patent Laid-Open No. 2003-283404 discloses a technique for creating a delay profile for each antenna directivity characteristic and determining, based on the delay profiles, an element antenna weight value that forms a directivity characteristic having a narrower beam width for the next-to-be-executed directivity angle search. In the technique of Japanese Patent Laid-Open No. 2003-283404, this processing is repeated to enable high-precision detection of communication paths. Japanese Patent Laid-Open No. 2001-345747 discloses a technique for creating a delay profile for each antenna directivity characteristic so as to detect an effective communication path and, with use of a demodulation time that corresponds to the obtained communication path and the antenna directivity characteristic, demodulating a signal with a demodulator that is assigned to each communication path. The technique of Japanese Patent Laid-Open No. 2001-345747 uses a different communication path depending on the antenna directivity characteristic, thereby reducing interference on signals transmitted from a mobile station to a base station caused by signals from other mobile stations. In this way, with conventional techniques, the direction-of-arrival estimation of radio waves and determination of antenna directivity characteristics to be used has been performed using delay profiles of received signals.

A communication system that requires frequent directivity angle searches could be required to achieve low power consumption when performing directivity angle searches. However, with the conventional techniques, when a directivity angle search is performed, the receiver operates irrespective of whether or not radio waves have arrived. Thus, there is a problem that more power than necessary may be consumed.

The present invention has been conceived in view of the above-described problem and provides a technique for reducing power consumption associated with directivity angle searches, using delay profiles of received signals.

SUMMARY OF THE INVENTION

According to one aspect of the present invention, there is provided a communication apparatus comprising an acquisition unit configured to acquire a delay profile for a first transmit signal from a transmitting apparatus and a determination unit configured to determine an end time at which to end detection of a second transmit signal from the transmitting apparatus, based on the delay profile.

According to one aspect of the present invention, there is provided a communication apparatus comprising an acquisition unit configured to acquire a delay profile based on a first signal that is received from a transmitting apparatus using an antenna directivity characteristic wider than a predetermined width, and acquire a reception time of a receive signal that exceeds a predetermined threshold value from the acquired delay profile and a control unit configured to, when a signal that is transmitted from the transmitting apparatus using an antenna directivity characteristic that has a beam peak at a predetermined transmission angle is received using an antenna directivity characteristic that has a beam peak at a predetermined reception angle, control a period of a search for a signal from the transmitting apparatus based on the reception time acquired by the acquisition unit.

According to one aspect of the present invention, there is provided a communication system for performing communication between a transmitting apparatus and a receiving apparatus, the transmitting apparatus comprising a transmission unit configured to transmit a known training sequence between the transmitting apparatus and the receiving apparatus, and the receiving apparatus comprising a plurality of receiving antennas, a forming unit configured to control the receiving antennas and form a predetermined antenna directivity characteristic, an acquisition unit configured to receive the training sequence by causing the forming unit to form an antenna directivity characteristic wider than a predetermined width, and acquire a delay profile for a receive signal, a selection unit configured to select at least one communication path to be used in communication, based on a correlation intensity included in the delay profile, a detection unit configured to determine a reception intensity of a receive signal for a plurality of angles and detect an angle that ensures a predetermined reception quality, by causing the forming unit to form an antenna directivity characteristic that has a beam peak at a predetermined angle, and a control unit configured to control the detection unit so that the detection unit operates in accordance with a reception time of a signal from the selected communication path.

According to one aspect of the present invention, there is provided a method for controlling a communication apparatus, comprising acquiring a delay profile for a first transmit signal from a transmitting apparatus; and determining an end time at which to end detection of a second transmit signal from the transmitting apparatus, based on the delay profile.

According to one aspect of the present invention, there is provided a method for controlling a communication apparatus, comprising acquiring a delay profile based on a first signal that is received from a transmitting apparatus using an antenna directivity characteristic wider than a predetermined width, acquiring a reception time of a receive signal that exceeds a predetermined threshold value, from the delay profile, and when a signal that is transmitted from the transmitting apparatus using an antenna directivity characteristic that has a beam peak at a predetermined transmission angle is received using an antenna directivity characteristic that has a beam peak at a predetermined reception angle, controlling a period of search for a signal from the transmitting apparatus, based on the reception time.

Further features of the present invention will be apparent from the following description of exemplary embodiments with reference to the attached drawings.

BRIEF DESCRIPTION OF THE DRAWINGS

FIG. 3 shows a configuration of a wireless communication system.

FIG. 12B shows a timing signal according to the third embodiment.

DESCRIPTION OF THE EMBODIMENTS

Exemplary embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

General Directivity Angle Search

Figure 1:
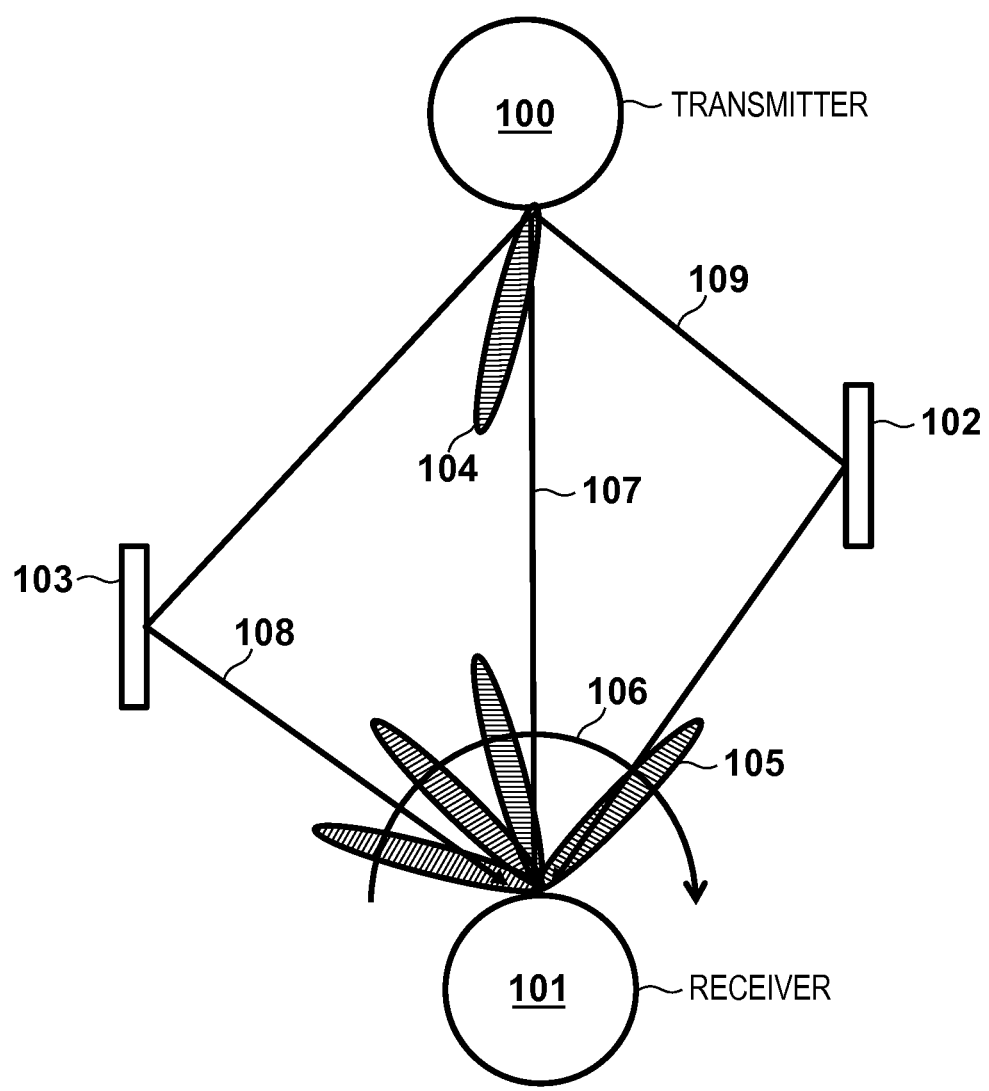
FIG. 1 is a schematic diagram illustrating a general directivity angle search.

FIG. 1 schematically illustrates a general directivity angle search. A transmitter 100 transmits data signals using antennas that have directivity characteristics 104. Transmitted signals are received by a receiver 101 through a communication path 107 that is not affected by reflection or the like and communication paths 108 and 109 that involve reflection from reflectors 102 and 103. Here, radio waves that are received through a communication path that involves neither reflection nor diffraction are referred to as "direct waves", and radio waves that are reflected and then received are referred to as "reflected waves". Note that the receiver 101 receives signals using antennas that have directivity characteristics 105.

As mentioned above, in a wireless communication system that performs communication using variable antenna directivity characteristics, both communication apparatuses, namely the transmitter 100 and the receiver 101, need to perform a directivity angle search. For a directivity angle search, first, the transmitter 100 fixes the directivity characteristics 104 (orientation directions) of the transmitting antennas to one characteristic as shown in FIG. 1, and the receiver 101 changes the directivity characteristics 105 of the receiving antennas as indicated by arrow 106 in FIG. 1. The receiver 101 estimates the direction of arrival of radio waves from the transmitter 100 by determining the reception quality of the radio waves and stores communication path information when radio waves with desired reception qualities have been received. The communication path information as referred to here is assumed to be transmission/reception orientation directions (angles) in the case where radio waves with the desired reception qualities are received. The reception qualities are assumed to be the intensity of a received signal, the signal-to-noise power ratio (SNR), the bit-error rate (BER), and so on, or assumed to be determined therefrom.

Next, the transmitter 100 changes the directivity characteristic 104 of the antennas, and the receiver 101 similarly estimates the direction of arrival of radio waves by changing the directivity characteristic 105 of the receiving antenna and stores communication path information when radio waves with the desired reception qualities have been received. Then, the above-described operations are repeated for all possible combinations of the directivity characteristics of the transmitting and receiving antennas, and information regarding communication paths that enable communication is stored.

As for setting values such as weight values for forming the directivity characteristics of the transmitting and receiving antennas, for example, setting values corresponding to transmission/reception angles are stored in advance in a look-up table or the like. In this case, the transmitter 100 and the receiver 101 can easily realize desired antenna directivity characteristics by simply referencing that look-up table.

The transmitter 100 and the receiver 101 perform communication using the communication path information stored as a result of the directivity angle searches. When the currently used communication path is interrupted during data communication, it is switched to another stored communication path, and the communication is continued.

Figure 2:
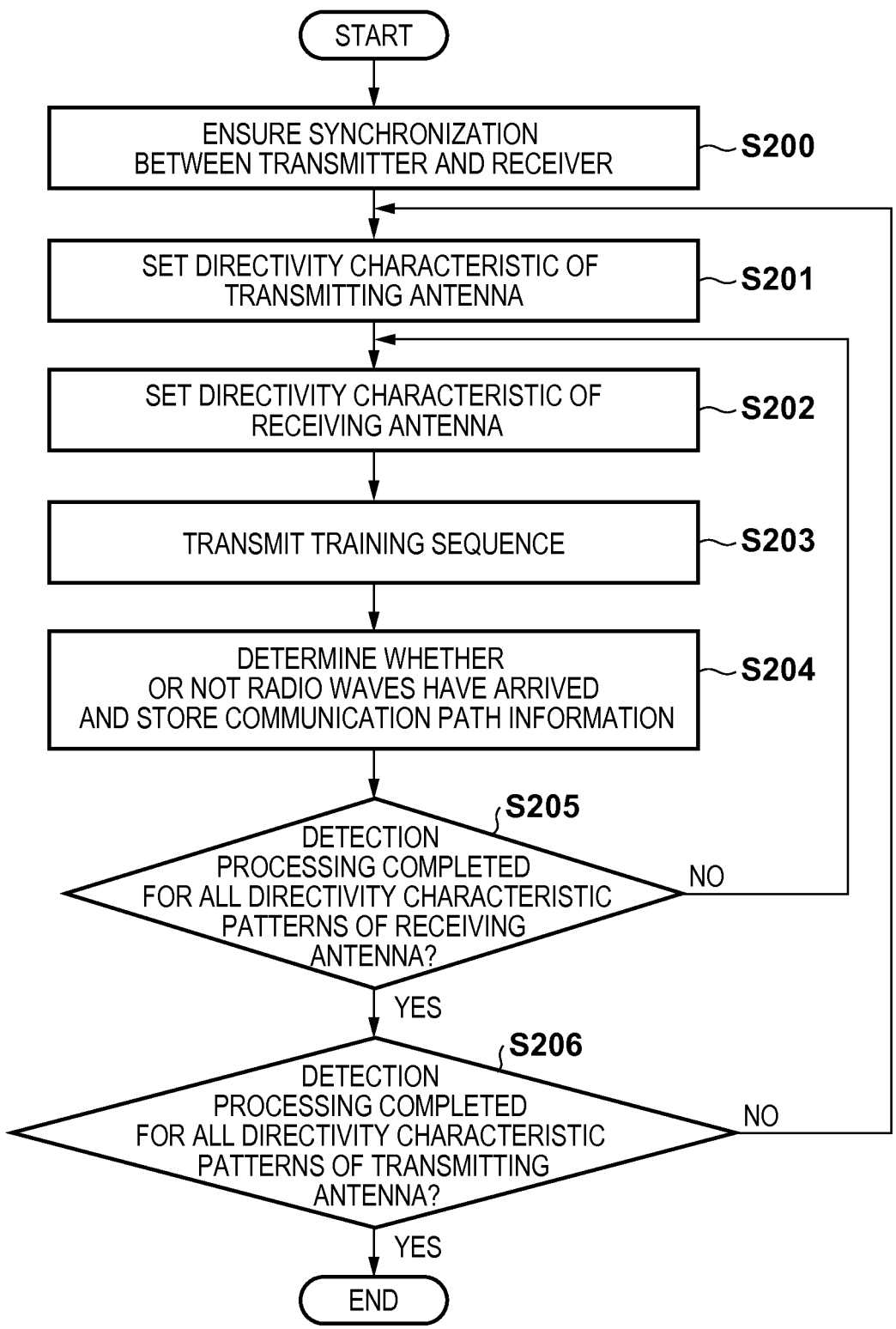
FIG. 2 is a flowchart showing processing of a general directivity angle search.

FIG. 2 is a flowchart showing processing of a directivity angle search. When the processing has started, the transmitter 100 and the receiver 101 perform synchronization acquisition in order to adjust the timing of switching of the antenna directivity characteristics (step S200). Next, the transmitter 100 sets the directivity characteristic of the transmitting antennas (step S201), and the receiver 101 sets the directivity characteristic of the receiving antennas (step S202). When these settings have been performed, the transmitter 100 starts transmitting a training sequence that is a known sequence, to the receiver 101 (step S203). Then, the receiver 101 determines whether or not the training sequence has been received by means of, for example, correlation detection or the like and stores communication path information when the training sequence has been received at a desired reception quality (step S204).

Then, it is determined whether or not detection processing has been completed for all usable directivity characteristic patterns of the receiving antennas that the receiver 101 can switch to and use for one directivity characteristic of the transmitting antennas (step S205). If the detection processing has not yet been completed for all the directivity characteristic patterns of the receiving antennas (No in step S205), the procedure returns to step S202 and the above-described processing is repeated. In this way, for one directivity characteristic of the transmitting antennas, detection processing is executed for all the directivity characteristic patterns of the receiving antennas. If the detection processing has ended (Yes in step S205), it is determined whether or not detection processing has been completed for all usable directivity characteristic patterns of the transmitting antennas that the transmitter 100 can switch to and use (step S206). If the detection processing has not yet been completed for all the directivity characteristic patterns of the transmitting antennas (No in step S206), the procedure returns to step S201 and the above-described processing is repeated. In this way, for all the directivity characteristic patterns of the transmitting antennas, the detection processing is executed for all the directivity characteristic patterns of the receiving antennas.

Note that since synchronization acquisition performed during the directivity angle search operation conforms to the accuracy of synchronization between the transmitter and the receiver, the step of synchronization acquisition may be added after steps S205 and S206. When executing synchronization acquisition during the directivity angle search operation, the transmitter 100 and the receiver 101 may set antenna weight values such that the directivity characteristics of their transmitting and receiving antennas have wide beam widths. Alternatively, it is also possible to separately provide a broad directional antenna and to use the broad directional antenna for synchronization acquisition and use a plurality of antennas other than the broad directional antenna for directivity angle search. Note that an antenna directivity characteristic with a wide beam width may be realized by turning only one of a plurality of antenna elements on and turning the other antennas off, without separately providing a broad directional antenna. Furthermore, if in the directivity angle search operation, information regarding a communication path that ensures the desired quality can be acquired when using a predetermined antenna directivity characteristic, synchronization acquisition may be performed using the antenna directivity characteristic corresponding to the acquired communication path.

Wireless Communication System

FIG. 3 shows a configuration of a wireless communication system according to the present embodiment. A transmitter 300 and a receiver 301 perform communication via a direct wave 309 and reflected waves 310 to 314 from reflectors 302 to 306. The transmitter 300 and the receiver 301 exchange a training sequence that is a known sequence therebetween using their antenna directivity characteristics 307 and 308 with wide beam widths, before the aforementioned directivity angle search operation. Note here that array antennas may use a weight value for forming a directivity characteristic with a wide beam width or a broad directional antenna may be separately provided. The receiver 301 generates a delay profile characteristic from the received training sequence, and based on the delay profile characteristic, generates an operation timing signal for a receiving circuit and selects a period for executing transmission and reception of the training sequence.

Configuration of Transmitter

Figure 4:
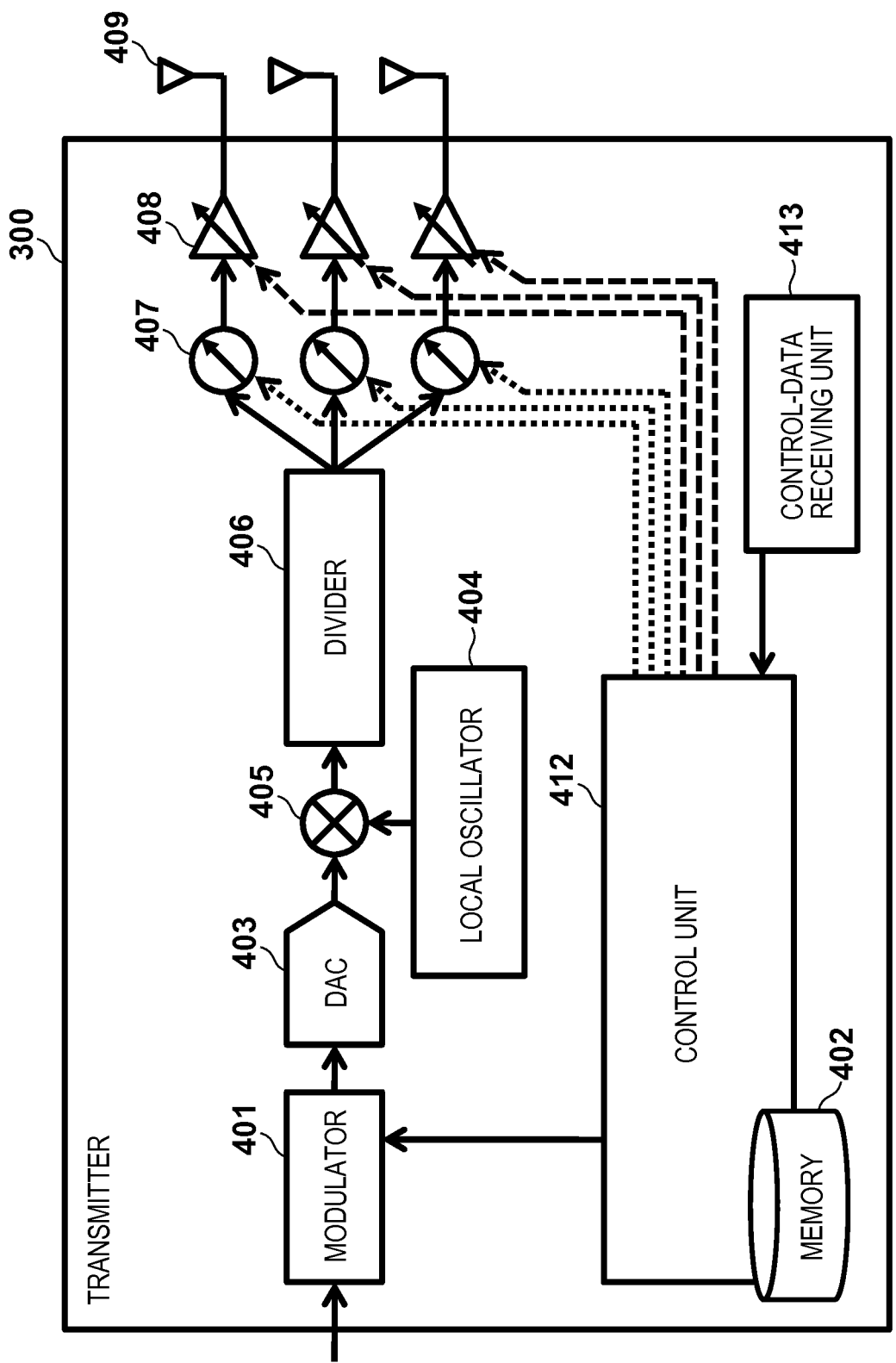
FIG. 4 shows an exemplary configuration of a transmitter.

FIG. 4 shows an exemplary configuration of the transmitter 300 according to the present embodiment. A control unit 412 performs overall control of the operation of the transmitter 300 and gives a training sequence stored in a memory 402 to a modulator 401. The training sequence is modulated by the modulator 401 and converted into an analog signal by a digital-to-analog converter (DAC) 403. The converted analog signal is frequency converted in a mixer 405 by being multiplied by a local signal generated by a local oscillator 404 and is output as a signal in the desired wireless frequency band. The frequency-converted signal is input via a divider 406 to variable phase shifters 407. In the variable phase shifters 407, the phase of the signal is shifted and set to a predetermined value. The phase-shifted signals are input to variable amplifiers 408. The variable amplifiers 408 amplify the received signals so that the signals have predetermined amplitudes. The amplified signals are transmitted via antennas 409. In this way, weights are assigned to the transmitted signal by the variable phase shifters 407 and the variable amplifiers 408.

Here, the aforementioned predetermined phase and amplitude values, i.e., weight values, used in the variable phase shifters 407 and the variable amplifiers 408 are set such that the beam peak occurs at a desired transmission angle in the antenna directivity characteristic. The setting of these values is executed by the control unit 412 in accordance with a look-up table of communication path information stored in the memory 402.

A control-data receiving unit 413 receives signals such as an acknowledge (ACK) signal and a notification signal for notifying the period for transmitting a training sequence from the receiver 301 and gives control data included in these signals to the control unit 412. In data communication, the transmitter 300 performs modulation and frequency conversion on signals received from outside and given to the modulator 401 and transmits the resultant signals in the same manner as when transmitting the training sequence.

Configuration of Receiver

Figure 5:
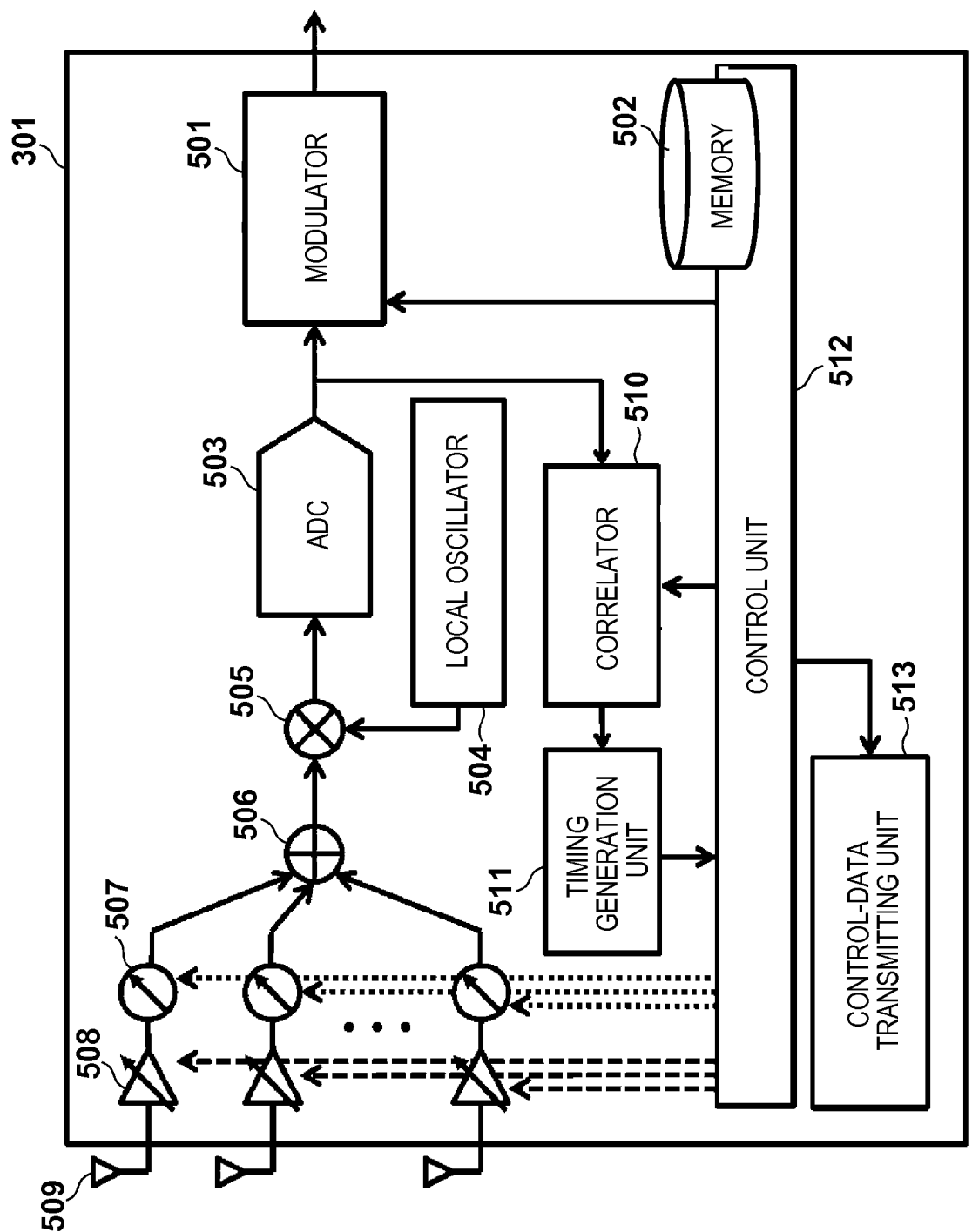
FIG. 5 shows an exemplary configuration of a receiver.

FIG. 5 shows an exemplary configuration of the receiver 301 according to the present embodiment. The receiver 301 receives signals such as a training sequence from the antennas 509. The signals received via the plurality of antennas 509 are each subjected to predetermined amplification performed by variable amplifiers 508, and the phases of the amplified signals are changed by variable phase shifters 507. The signals output from a plurality of variable phase shifters 507 are added together by an adder 506. A mixer 505 multiplies the signal obtained by the addition by a local signal generated by a local oscillator 504 and down-converts the multiplied signal into a baseband signal. The baseband signal is converted into a digital signal by an analog-to-digital converter (ADC) 503 and demodulated by a demodulator 501.

As in the case of the transmitter 300, the variable phase shifters 507 and the variable amplifiers 508 are functional units that assign weights to signals. Here, weight values are set such that the beam peak occurs at a desired receiving angle in the antenna directivity characteristics. The setting of these values is executed by a control unit 512 in accordance with a look-up table for setting receiving antennas, stored in a memory 502.

A control-data transmitting unit 513 transmits signals that include control data, such as an ACK signal generated by the control unit 512 and a notification signal for notifying the period for transmitting or receiving a training sequence, to the transmitter 300. A correlator 510 calculates a value of correlation between the received training sequence and training sequences stored in the memory 502, calculates reception intensity and reception timing for each communication path, and acquires a delay profile. Then, the correlator 510 gives the acquired delay profile to a timing generation unit 511. Using, for example, a pseudo noise (PN) sequence as a training sequence and performing calculation of correlation between the received signal and the training sequence makes it possible to detect reception intensity and reception timing for the signal received through each path. In this way, the training sequence may be a sequence that has favorable autocorrelation and cross-correlation characteristics, such as a PN sequence.

The timing generation unit 511 generates a timing signal for controlling the operation of the receiving circuit from the acquired delay profile and gives the timing signal to the control unit 512. The control unit 512 performs on/off control of the receiving circuit in accordance with the generated timing signal. Here, an instruction that the control unit 512 gives to the receiving circuit using the timing signal is not limited to on/off control, and may be other control instructions. Note that since FIG. 5 illustrates function blocks of the physical layer of the receiver 301, the received signal that has undergone demodulation by the demodulator 501 is output to, for example, a block of an upper layer of the receiver 301 that executes upper-level processing.

Delay Profile

Figure 6:
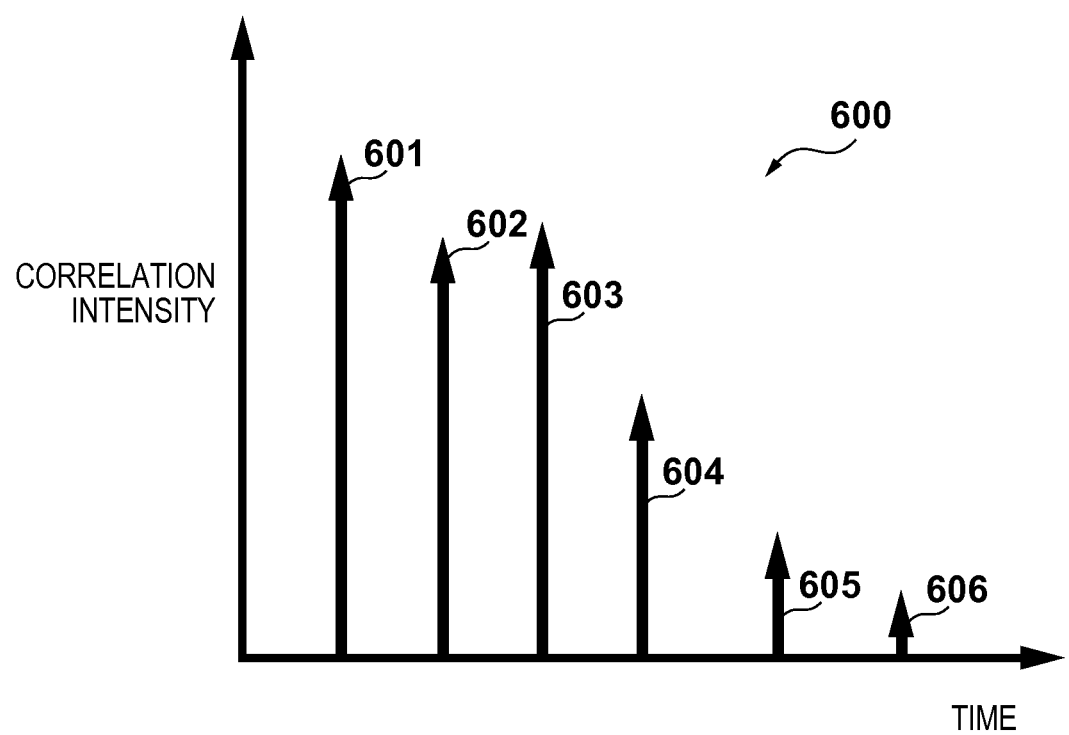
FIG. 6 shows an example of a delay profile assumed in an embodiment.

FIG. 6 shows an example of a delay profile assumed in the present embodiment. Illustrated is a delay profile 600 for the case in which a signal transmitted from the transmitter 300 is received by the receiver 301. For estimation of the delay profile 600, the transmitter 300 and the receiver 301 respectively transmit and receive a training sequence using antennas having the antenna directivity characteristics 307 and 308 with beam widths wider than a predetermined width. Then, the receiver 301 obtains the delay profile 600 as shown in FIG. 6 by the correlator 510 performing correlation detection on received signals and detecting correlation peaks with use of a known training sequence. In FIG. 6, the vertical axis indicates the intensity of the correlation peak as a result of the correlator 510 performing correlation detection, and the horizontal axis indicates the arrival time of the signal. The received signals include the direct wave 309 and the reflected waves 310 to 314 and are each received at different times as shown in FIG. 6. It is assumed that a correlation peak 601 corresponds to the direct wave 309.

Configuration of Timing Signal

Figure 7:
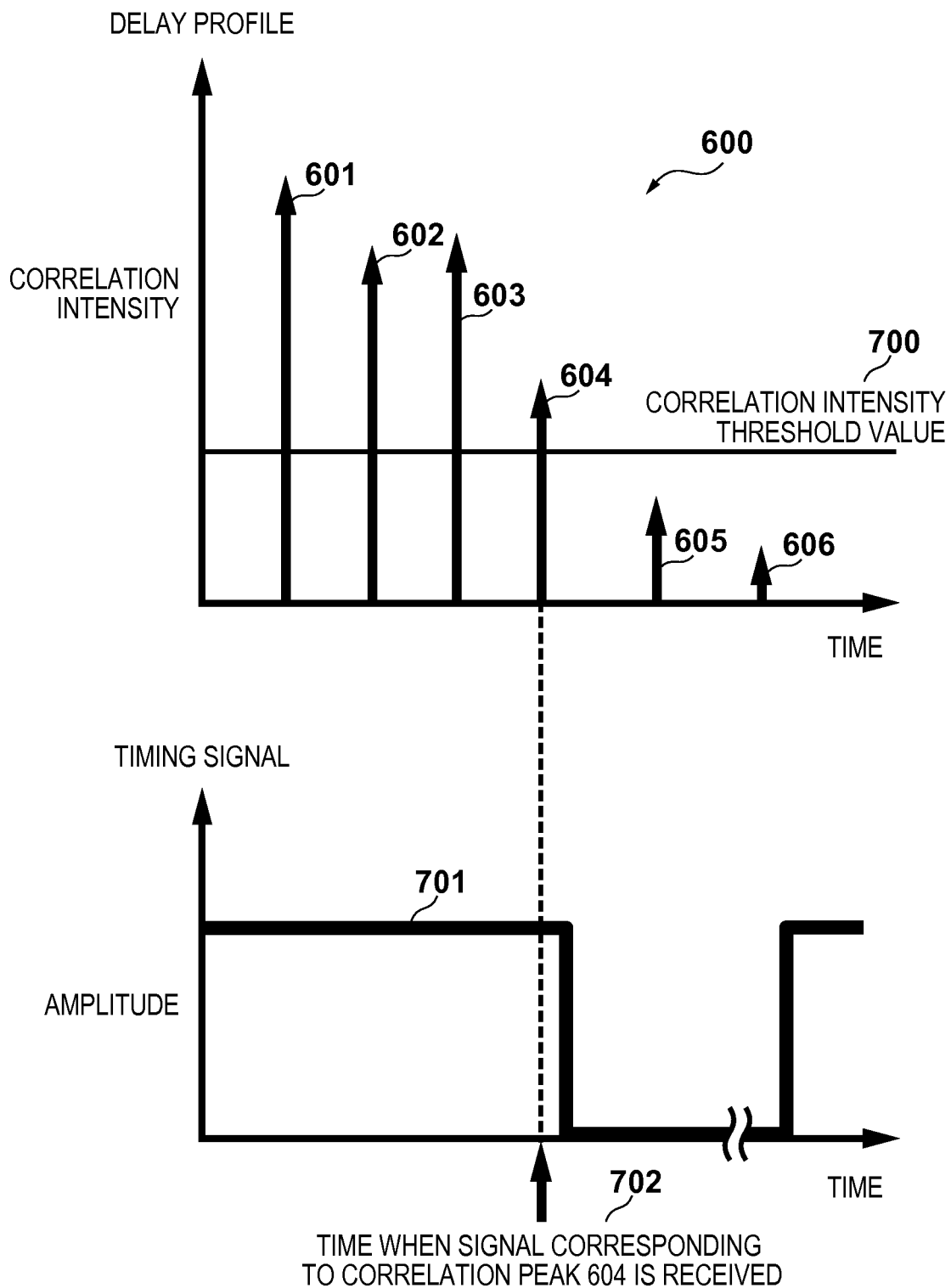
FIG. 7 shows an example of a timing signal.

FIG. 7 shows an example of the timing signal output from the timing generation unit 511 of the receiver 301 according to the present embodiment. The timing generation unit 511 selects, from the delay profile 600 acquired by the correlator 510, correlation peaks 601 to 604 that have correlation intensities higher than a predetermined correlation-intensity threshold value 700. Here, the correlation intensity threshold value is predetermined based on, for example, the highest receiving sensitivity, reception dynamic range, bit-error rate (BER), signal-to-noise power ratio (SNR), and the like of the receiver 301. Note that the number of correlation peaks selected here corresponds to the number of pieces of communication path information regarding the allowable level of communication paths that is stored. Specifically, in the example of FIG. 7, four pieces of communication path information are stored in the memory 502. While in the present example, the number of pieces of communication path information to be selected and stored is determined based on the relationship between the correlation peak and the predetermined correlation intensity threshold value, that number may be defined in advance.

The timing generation unit 511 then selects a correlation peak that corresponds to the most delayed received signal from among the selected correlation peaks. Specifically, in the example of FIG. 6, the timing generation unit 511 selects the correlation peak 604. Then, the timing generation unit 511 generates a timing signal 701 based on the selected correlation peak 604.

The timing signal 701 is specifically, for example, a signal that switches from on to off between the time when the signal corresponding to the correlation peak 604 is received and the time when the signal corresponding to the correlation peak 605 is received, as shown in FIG. 7. Also, the timing signal 701 is, for example, a signal that switches from off to on before the time when the signal corresponding to the correlation peak 601 is received. In FIG. 7, the timing of on/off switching of the timing signal 701 is defined by including a predetermined time margin after a time 702 at which the signal corresponding to the correlation peak 604 has been received, in consideration of the accuracy of synchronization between the transmitter and the receiver. However, the timing of on/off switching of the timing signal 701 does not necessarily have to be defined in the way shown in FIG. 7, and for example, the timing signal may be switched exactly at the arrival time of the delay wave corresponding to that correlation peak. Note that the timing signal 701 is repeatedly used in directivity angle search operations similar to that shown in FIG. 2.

Although in the example of FIG. 7, for convenience of illustration, the time at which the correlation peak occurs and the time at which the timing signal 701 switches from on to off coincide, these times do not coincide in actuality. This is because the correlation peak is the result of correlation detection performed by the correlator 510 and does not represent the received signal itself. The timing of on/off switching in the timing signal 701 is calculated based on the reception timing for each path, which is included in the actual received signal. Note that the reception timing for each path can be obtained by, for example, an inverse operation using the time of occurrence of the correlation peak, based on the time required for the calculation of correlation.

Figure 8A:
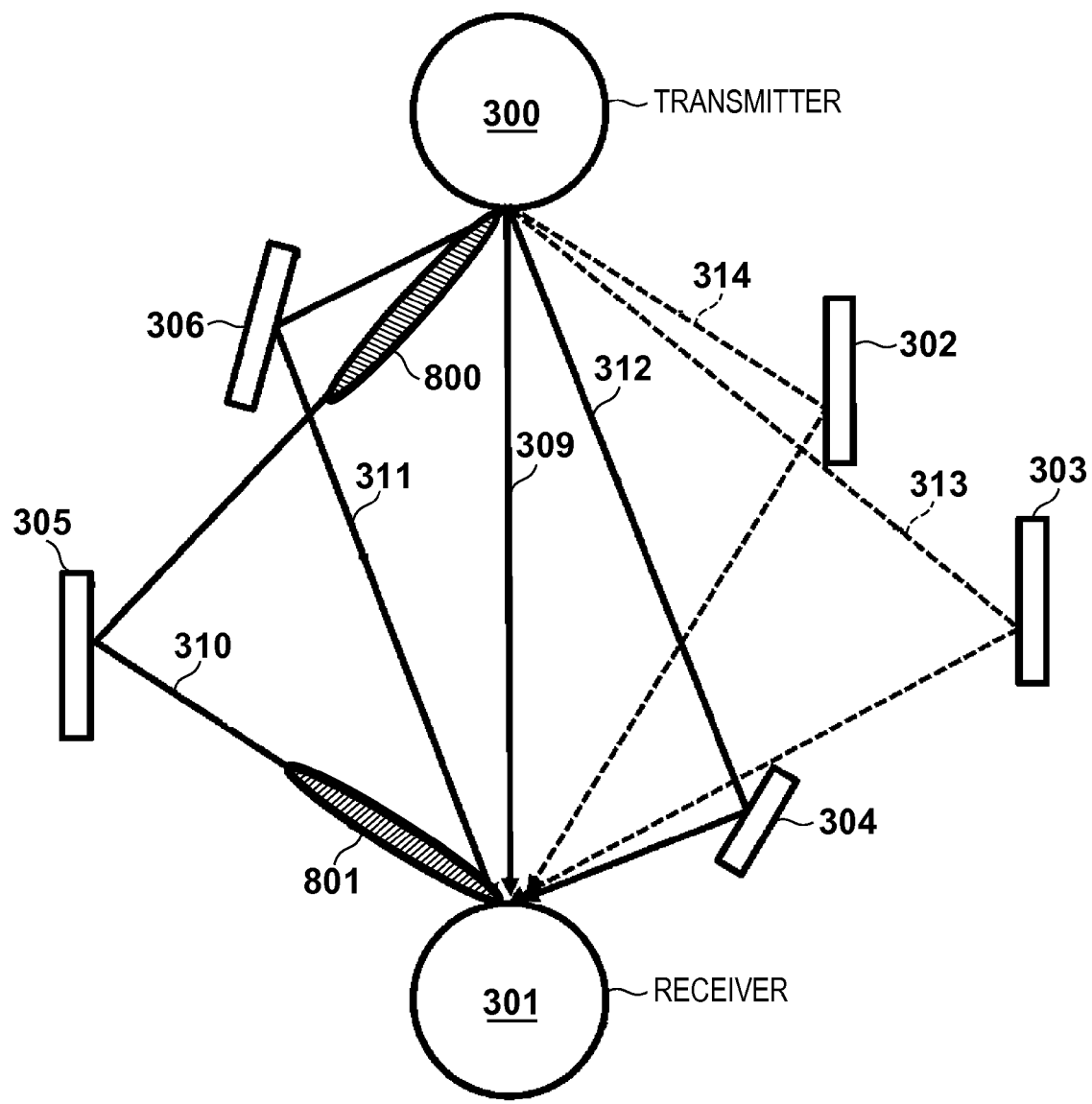
FIG. 8A is a schematic diagram illustrating a directivity angle search performed on predetermined transmission/reception antenna directivity characteristics.

FIG. 8A schematically illustrates a directivity angle search in the case where the transmitter 300 and the receiver 301 respectively use transmitting and receiving antennas for which antenna directivity characteristics 800 and 801 are set, respectively. The transmitter 300 and the receiver 301 set the directivity characteristics of their transmitting and receiving antennas to 800 and 801 in FIG. 8A, respectively, as in the steps S201 and S202 in FIG. 2 and then perform transmission and reception of signals using the timing signal 701 as in steps S203 and S204.

Figure 8B:
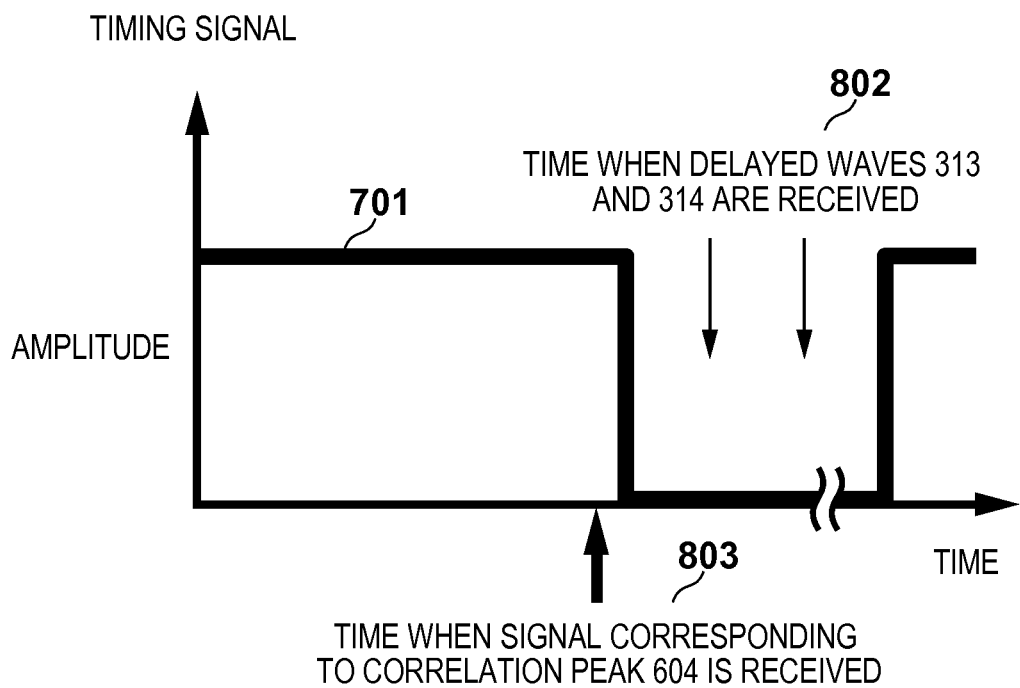
FIG. 8B shows a timing signal in FIG. 8A.

Note that in FIG. 8A, a direct wave 309 and reflected waves 310 to 312 correspond to one of the correlation peaks 601 to 604 in FIG. 6 and reflected wave 313 and 314 correspond to the correlation peaks 605 and 606. That is, the direct wave 309 and the reflected waves 310 to 312 form paths that enable signal reception at a predetermined level or more when antenna directivity characteristics with wide beam widths are used. Thus, in the present embodiment, the receiver 301 receives signals only during the period of arrival of signals that can be received at a predetermined level or more and does not perform the operation of receiving signals during other periods during a directivity angle search. In other words, as shown in FIG. 8B, the timing signal 701 switched from on to off between a time 803 when the signal corresponding to the correlation peak 604 is received and a time when the signal corresponding to the correlation peak 605 is received. As a result, the timing signal 701 is off at times 802 when the reflected waves 313 and 314 are received, and the receiver 301 does not receive the reflected waves 313 and 314.

Flowchart of Operations

Figure 9:
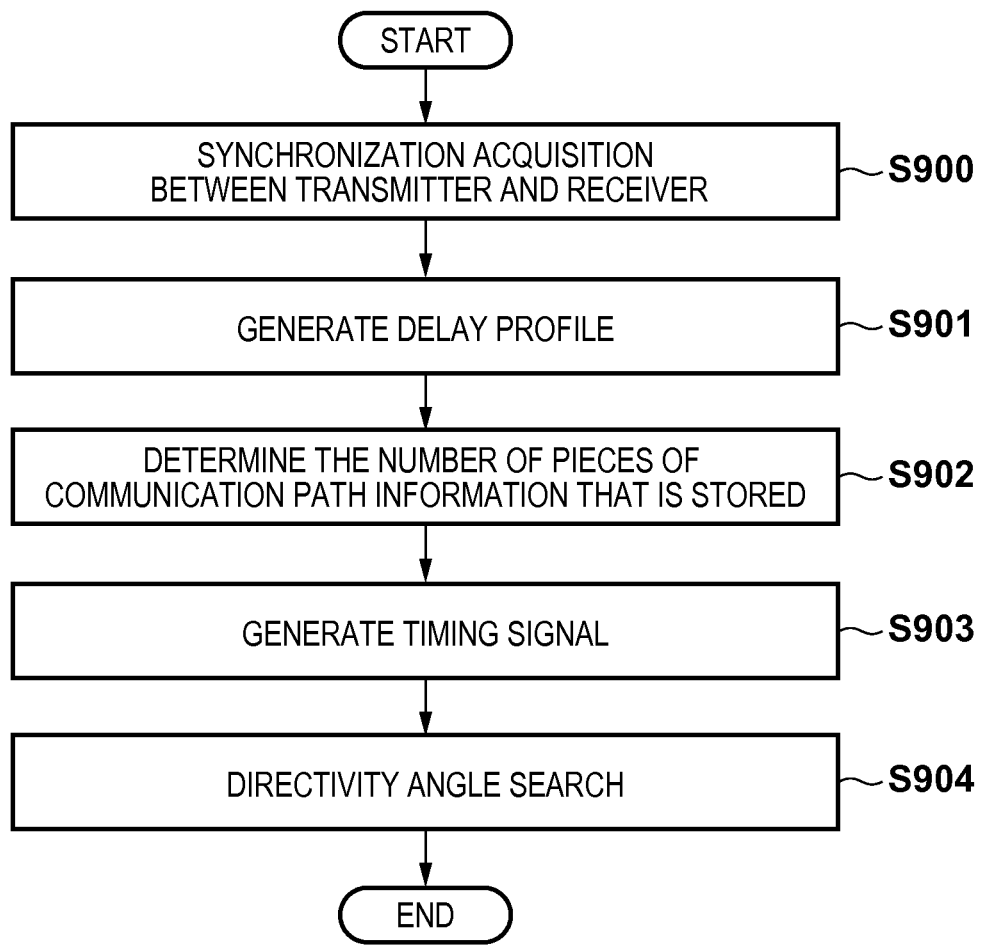
FIG. 9 is a flowchart showing processing of a directivity angle search.

FIG. 9 is a flowchart of operations of directivity angle search according to the present embodiment. In the flowchart of operations, first, synchronization acquisition is performed between the transmitter 300 and the receiver 301, using directivity characteristics with wide beam widths as the directivity characteristics of the transmitting and receiving antennas (step S900). Next, the transmitter 300 transmits a training sequence, and the receiver 301 receives the timing sequence and performs correlation detection so as to acquire a delay profile (step S901). Then, the number of pieces of communication path information that is stored is determined based on the acquired delay profile (step S902). Then, the receiver 301 generates a timing signal based on the delay profile as described above (step S903). The receiver 301 then performs a directivity angle search in accordance with the generated timing signal as in steps S201 to S206 in FIG. 2 (step S904) and stores communication path information when signals with desired reception qualities are received.

Figure 10:
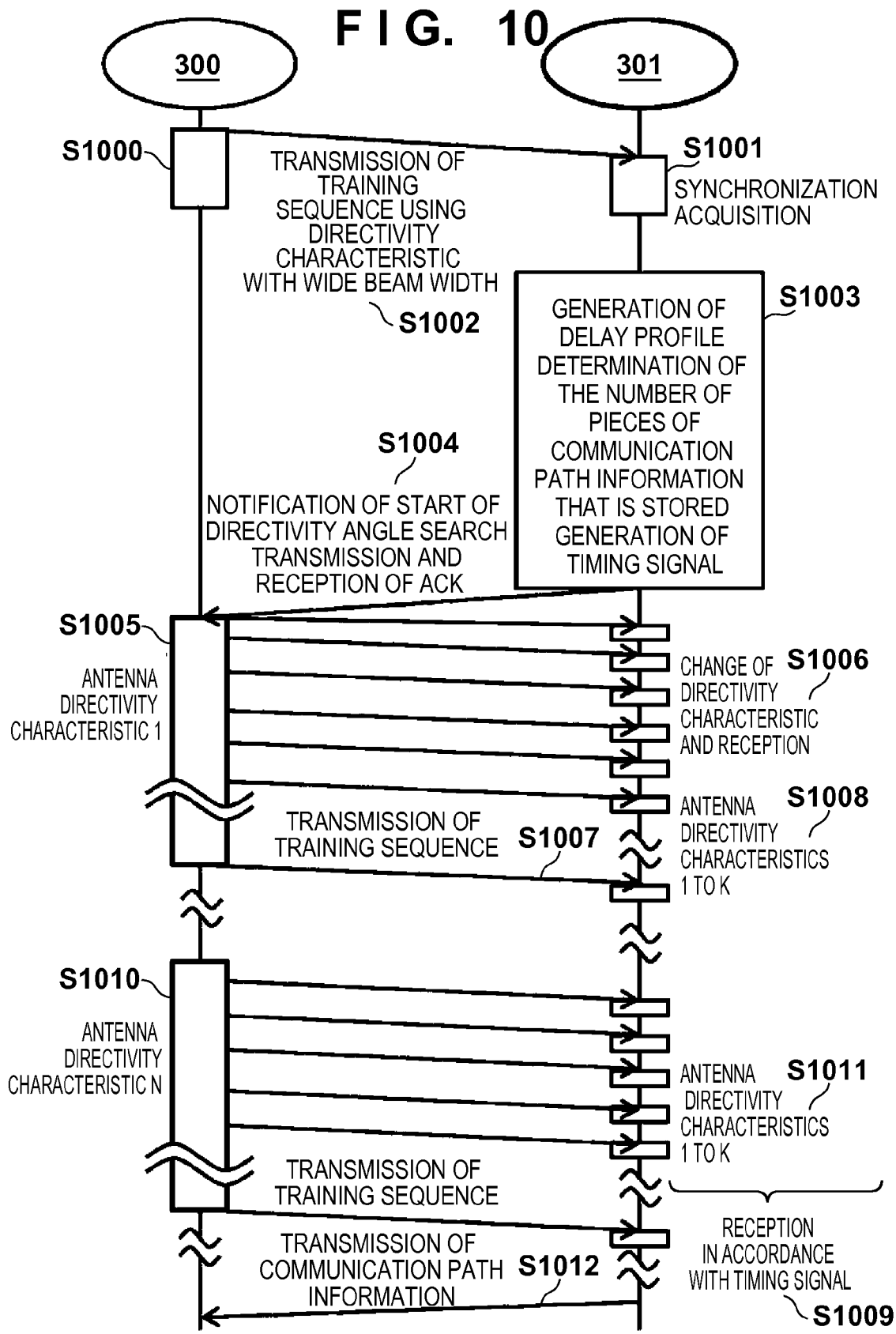
FIG. 10 is a sequence chart showing processing performed between a transmitter and a receiver.

FIG. 10 is a sequence chart of operations performed between the transmitter 300 and the receiver 301 according to the present embodiment. The transmitter 300 forms an antenna directivity characteristic with a wide beam width and transmits a training sequence (step S1000). The receiver 301 forms an antenna directivity characteristic with a wide beam width and receives the training sequence. Then, the receiver 301 performs synchronization acquisition (step S1001) through the reception of the training sequence from the transmitter 300 (step S1002). Thereafter, the receiver 301 acquires a delay profile, using the received training sequence (step S1003). The receiver 301 also determines the number of pieces of communication path information that is stored and generates a timing signal, based on the delay profile information (step S1003). Then, the receiver 301 notifies the transmitter 300 to start the directivity angle search (step S1004), and the transmitter 300 transmits an ACK signal to the receiver 301. Note that as a notification of start of the directivity angle search, the receiver 301 transmits a period for transmitting a training sequence to the transmitter 300.

When the directivity angle search has started, the transmitter 300 changes the antenna directivity characteristic with a wide beam width to another antenna directivity characteristic with a beam width that has the peak in a specific direction (step S1005). The receiver 301 also changes the antenna directivity characteristic with a wide beam width to another antenna directivity characteristic with a beam width that has the peak in a specific direction (step S1006). After the antenna directivity characteristics have been changed, the transmitter 300 transmits a training sequence in accordance with the period for transmitting a training sequence (step S1007). After the directivity characteristic of the receiving antennas has been set, the receiver 301 performs a reception operation based on the timing signal generated in step S1003 (step S1009). Specifically, for example, the receiver 301 temporarily suspends the reception operation when the timing signal has switched from on to off. Also, the receiver activates or reactivates the reception operation when the timing signal has switched from off to on. When it becomes time to change the directivity characteristic of the receiving antennas, the receiver 301 changes the directivity characteristic to the next one and performs a reception operation based on the timing signal generated in step S1003 (step S1009). At this time, the receiver 301 changes the directivity characteristic of the receiving antennas and performs a reception operation in accordance with the period for transmitting a training sequence, which has been notified to the transmitter 300. If K is the number of possible directivity characteristic patterns of the receiving antennas, the reception operation is performed for all the directivity characteristics 1 to K, and communication path information regarding communication paths that enable signal reception at the desired reception quality is stored in the memory 502.

Using a directivity characteristic of the receiving antennas with a sufficiently narrow beam width makes it possible to determine, for each single path, a pair of transmission/reception directivity characteristic patterns that enable signal reception at the desired reception quality. However, for example, in the case of using a directivity characteristic of the receiving antennas with a beam width that is not narrow enough, signals from a single path may exceed the desired reception qualities with a plurality of directivity characteristics. As a result, the number of pieces of communication path information that ensure signal reception at the desired reception quality may exceed the number of information pieces that is stored, which has been determined in step S1003. In this case, for example, the communication path information may include information regarding correlation intensity in addition to the antenna directivity characteristic, and only the number of pieces of communication path information that is stored, determined based on the correlation intensity information, may be stored. In this case, for example, if it has been determined that the stored number of pieces of communication path information exceeds the number of information pieces that is stored, the receiver 301 may compare the correlation intensity of the received signal with the lowest one of the stored correlation intensities and store only the higher of these two correlation intensities.

When the receiver 301 has completed the reception operation and the extraction of the communication path information for all the directivity characteristics 1 to K, the transmitter 300 changes the directivity characteristic of the transmitting antennas to another one other than the currently used one (step S1010). Then, the transmitter 300 and the receiver 301 execute operations similar to those described above and store communication path information in the memory 502. When for all the directivity characteristic patterns of the transmitting antennas, the directivity angle search has been completed for all the directivity characteristic patterns of the receiving antennas, the receiver 301 transmits the communication path information that enables signal reception at the desired reception quality to the transmitter 300 in order to share directivity angle search information (step S1012).

Performing operations as described above allows the receiver 301 using the timing signal 701 to omit operations that would have been performed at times when low-power reflected waves are received. As a result, power consumption can be suppressed.

While in the above description, the receiver 301 temporarily suspends the operation of receiving the training sequence in accordance with the timing signal, the receiver 301 may perform an operation other than temporary suspension. For example, when the timing signal switches from on to off, the receiver 301 may change the directivity characteristic of the receiving antennas to the next directivity characteristic and perform a reception operation based on the timing signal generated in step S1003 (step S1009). Through this, it is possible to shorten the time required for the directivity angle search as compared with, for example, the case where the reception operation is performed until when the received signal 606 in FIG. 6 arrives at the receiver 301. Note that, in this case, the period for transmitting a training sequence on the transmitter 300 side is notified from the receiver 301 as a period that depends on the time when the directivity characteristic of the receiving antennas is changed. As a result, the period for performing training for all the directivity characteristics of the receiving antennas can be shortened.

Incidentally, as described above, the directivity angle search uses a training sequence in order to perform synchronization acquisition between the transmitter and the receiver, create a delay profile, and the like. In real-time data transmission, since data transmission is not performed or is performed at an extremely low transmission rate during the directivity angle search period, the directivity angle search period could be required to be short. Thus, the training sequence may be determined to be as long as is necessary, in accordance with the detection range of direct and reflected waves that can be assumed from the magnitude of the wireless communication system or the number of transmission/reception angles that is stored.

Accordingly, in the present embodiment, the length of the training sequence may be adjusted to be short based on the timing signal so as to shorten the directivity angle search period. For example, a configuration is possible in which the control unit 512 of the receiver 301 receives a timing signal from the timing generation unit 511 and determines the length of the training sequence, then the receiver 301 transmits a signal for notifying the length of the training sequence to the transmitter 300, and the transmitter 300 adjusts the length of the training sequence based on that signal.

Furthermore, in respect of the length of the training sequence, if the arrival of waves is determined by only the reception intensity of a signal during the directivity angle search operation (step S1009), a rectangular signal or pulse signal such as the timing signal 701, a training sequence that is shorter than normal, or the like can be used. However, in this case, interference waves may be received. Thus, for example in the case of using a short training sequence, a code for observing a delay profile may be added before the training sequence. In the case of using the timing signal 701, a period for receiving a code for acquiring a delay profile may be added prior to transmission of the timing signal. Through this, it is possible to suppress the length of the training sequence and to improve the transmission efficiency of signals.

As described above, according to the present embodiment, the period of search for the training sequence from the transmitter can be limited based on the timing signal, which suppresses power consumed during a directivity angle search. It is also possible, by changing the directivity characteristic of the receiving antennas based on the timing signal, to reduce the time required for the directivity angle search.

Second Embodiment

Next, a second embodiment will be described with reference to the drawings. The configurations of a wireless communication system, a transmitter 300, and a receiver 301 according to the present embodiment are similar to those described in the first embodiment, and thus a description thereof has been omitted. In the present embodiment, in order to further shorten the time required for the receiver 301 to perform reception operations, the time when a timing signal 701 similar to that of the first embodiment is switched from on to off when repeating the directivity angle search using the timing signal 701 is changed.

Figure 11:
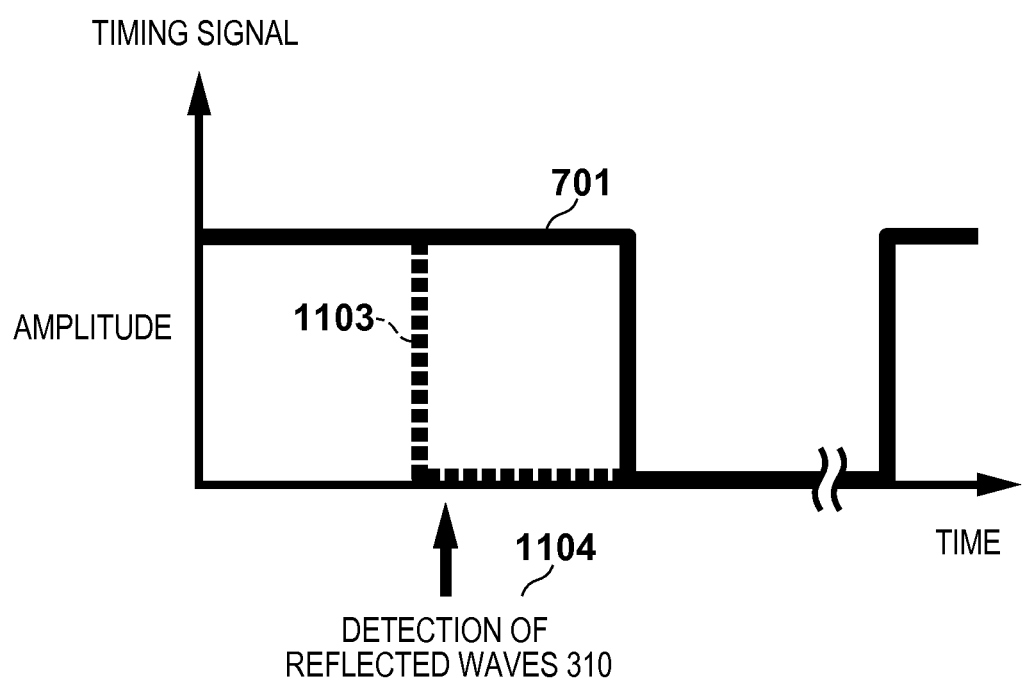
FIG. 11 shows a timing signal according to a second embodiment.

FIG. 11 shows a timing signal according to the present embodiment. In the present embodiment, for example, referring to FIG. 8A, when the arrival of radio waves is determined using the directivity characteristic 801 of the receiving antennas and the directivity characteristic 800 of the transmitting antennas, the reflected wave 310 is detected. It is assumed here that the reflected wave 310 arrives earlier than the fall time of the timing signal 701 generated by the timing generation unit 511, the fall time being indicated by the solid line in FIG. 11. At this time, upon detection of the reflected wave 310 (1104), the receiver 301 of the present embodiment immediately ends the reception operation and changes the directivity characteristic of the receiving antennas to the next one. Specifically, the timing signal 701 is changed to a timing signal 1103 indicated by the broken line in FIG. 11, and this timing signal 1103 is used to perform a reception operation. For the other directivity characteristics of the receiving antennas, the receiver 301 changes the timing signal 701 in a similar manner and performs on/off control of reception operations. As a result, it is possible to suppress power consumption of the receiver 301.

Third Embodiment

Next, a third embodiment will be described with reference to the drawings. The configurations of a wireless communication system, a transmitter 300, and a receiver 301 according to the present embodiment are similar to those described in the first embodiment, and thus a description thereof has been omitted. In the present embodiment, as in the second embodiment, the time when the timing signal is switched from on to off is changed in order to further shorten the time required for the receiver 301 to perform reception operations.

Figure 12A:
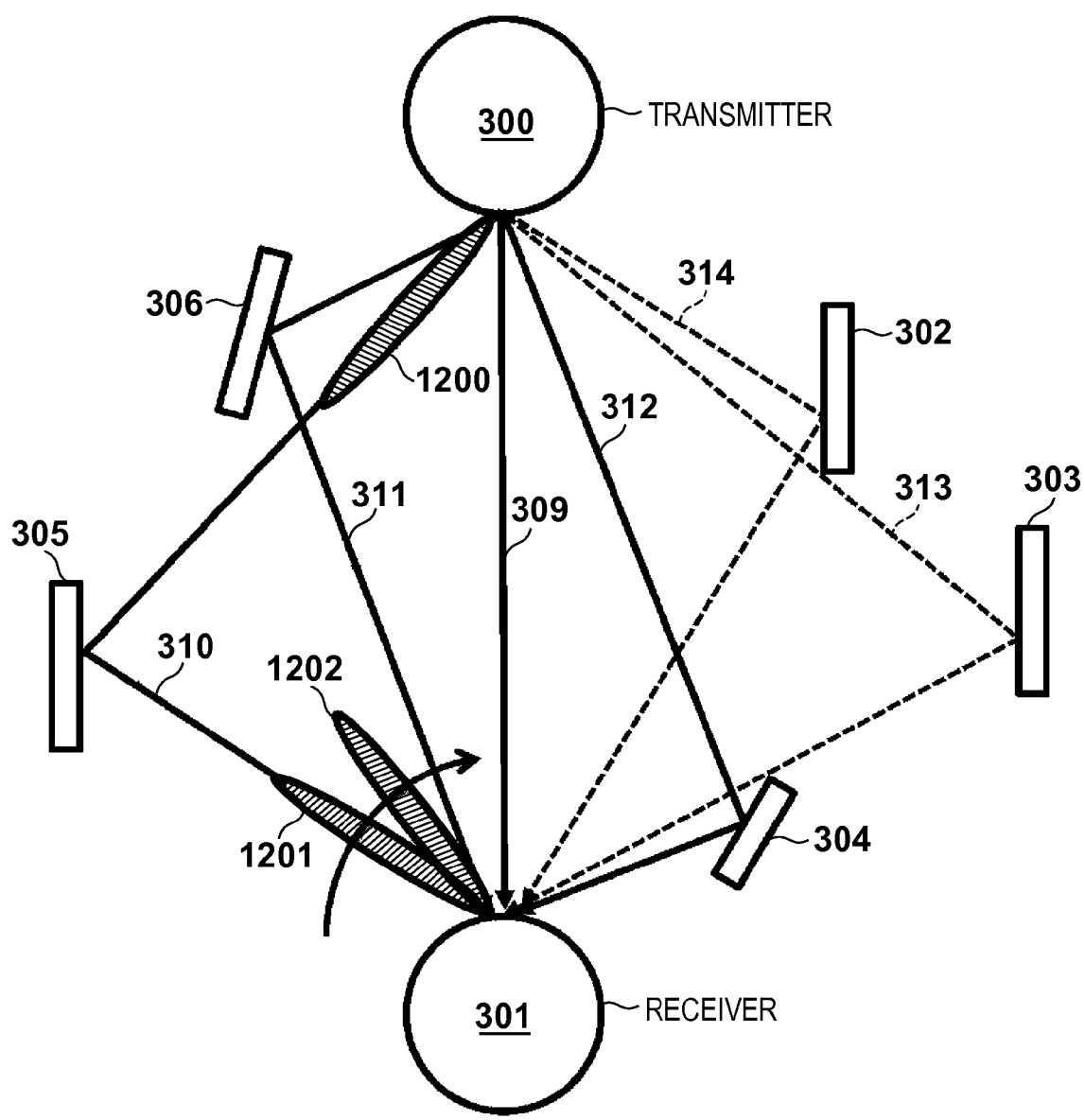
FIG. 12A is a schematic diagram illustrating directivity angle search performed on predetermined transmission/reception antenna directivity characteristics according to a third embodiment.

FIG. 12A shows a system for executing a directivity angle search according to the present embodiment. As shown in FIG. 12A, the transmitter 300 of the present embodiment transmits a training sequence using a directivity characteristic 1200, and the receiver 301 receivers the training sequence using first a directivity characteristic 1201 and then a directivity characteristic 1202.

In the present embodiment, when using the directivity characteristic 1201, the receiver 301 first switches the reception operation between on and off in accordance with the timing signal 701 generated by the timing generation unit 511. At this time, a reflected wave 310 is assumed to be received at a time 1204 in FIG. 12B with a desired reception quality for the directivity characteristic 1201. In this case, for the reflected wave 310, it is possible to specify the directivity characteristic 1200 on the transmission side and the directivity characteristic 1201 on the reception side as a pair of transmission/reception directivity characteristics that satisfy the desired reception quality. That is, there is no more need to perform the operation of receiving the training sequence at the time when the reflected wave 310 is received. Thus, in reception using the next directivity characteristic 1202 of the receiving antennas, the receiver 301 does not perform the reception operation at the time when the reflected wave 310 is received. In other words, the receiver 301 determines the arrival of radio waves using a timing signal 1203 indicated by the broken line in FIG. 12B. By repeating the above-described operation, the receiver 301 detects all communication paths that correspond to the defined number of information pieces that is stored, and upon detection of all the communication paths, notifies the transmitter 300 to end the directivity angle search.

With this configuration, it is possible to further shorten the reception operation period on the receiver 301 side and to further suppress power consumption. Moreover, since the processing ends upon detection of the defined number of communication paths that is stored, the time required for the transmitter 300 to transmit the training sequence can also be shortened, which results in an improvement in transmission efficiency and a reduction in power consumption.

OTHER EMBODIMENTS

While the above has been a detailed description of embodiments of the present invention, the present invention can be embodied as, for example, a system, an apparatus, a method, a program, or a storage medium. Specifically, the present invention may be applied to a system constituted from a plurality of devices, and may be applied to an apparatus constituted from one device.

The present invention provides a technique for reducing power consumption associated with directivity angle search, using a delay profile of a received signal.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-246859 filed on Nov. 10, 2011, which is hereby incorporated by reference herein in its entirety.

What is claimed is:

1. A communication apparatus comprising:
   an acquisition unit configured to acquire a delay profile for a first transmit signal from a transmitting apparatus;
   a determination unit configured to determine a start time at which to start detection of a second transmit signal from the transmitting apparatus and an end time at which to end the detection of the second transmit signal from the transmitting apparatus, based on the delay profile;
   a forming unit configured to control a plurality of antennas and form a predetermined antenna directivity characteristic, wherein the forming unit forms an antenna directivity characteristic that has a beam peak at a predetermined angle;
   a detection unit configured to detect a reception intensity of the second transmission signal from the transmitting apparatus;
   a control unit configured to control the detection unit such that the detection unit operates during a period between the start time and the end time that are determined by the determination unit, and does not operate at other times; and
   a selection unit configured to select an angle at which the reception intensity detected by the detection unit exceeds a predetermined intensity.

2. The communication apparatus according to claim 1, wherein the acquisition unit receives the first transmit signal using an antenna directivity characteristic of a predetermined width formed by the forming unit and acquires the delay profile.

3. The communication apparatus according to claim 1, wherein the first transmit signal is a known signal to the communication apparatus.

4. The communication apparatus according to claim 1, wherein the determination unit is included in a receiving circuit of the communication apparatus.

5. The communication apparatus according to claim 1, wherein the communication apparatus suspends an operation of receiving the second transmit signal from the transmitting apparatus, based on the end time determined by the determination unit.

6. The communication apparatus according to claim 1, wherein the communication apparatus starts the operation of receiving the second transmit signal from the transmitting apparatus, based on the start time determined by the determination unit.

7. The communication apparatus according to claim 1, wherein the selection unit selects, as the receiving angle to be used in communication, a predetermined number of the receiving angles in order of earlier to later reception times in the delay profile.

8. The communication apparatus according to claim 1, wherein, when the detection unit detects that the reception intensity at a predetermined angle satisfies a predetermined intensity, the control unit controls the detection unit such that, even at a time before the end time, the detection unit does not operate at other reception times at which the first transmit signal is received in the delay profile.

9. The communication apparatus according to claim 1, wherein, when the detection unit detects that the reception intensity at a predetermined angle satisfies a predetermined intensity, the control unit controls the detection unit such that, when the receiving angles other than the predetermined angle are selected, the detection unit does not operate at the reception time of the detected signal in the delay profile.

10. A method for controlling a communication apparatus, comprising:
    acquiring a delay profile for a first transmit signal from a transmitting apparatus;
    determining a start time at which to start detection of a second transmit signal from the transmitting apparatus and an end time at which to end the detection of the second transmit signal from the transmitting apparatus, based on the delay profile;
    controlling a plurality of antennas and forming a predetermined antenna directivity characteristic, wherein an antenna directivity characteristic that has a beam peak at a predetermined angle is formed,
    detecting a reception intensity of the second transmission signal from the transmitting apparatus;
    controlling the detection such that the detection is performed during a period between the determined start time and the determined end time, and is not performed at other times; and
    selecting an angle at which the detected reception intensity exceeds a predetermined intensity.

11. A non-transitory computer-readable storage medium storing a computer program for causing a computer to execute, in a communication apparatus including a plurality of antennas, the steps of:
    acquiring a delay profile for a first transmit signal from a transmitting apparatus;
    determining a start time at which to start detection of a second transmit signal from the transmitting apparatus and an end time at which to end the detection of the second transmit signal from the transmitting apparatus, based on the delay profile;

controlling a plurality of antennas and forming a predetermined antenna directivity characteristic, wherein an antenna directivity characteristic that has a beam peak at a predetermined angle is formed,
detecting a reception intensity of the second transmission signal from the transmitting apparatus;
controlling the detection such that the detection is performed during a period between the determined start time and the determined end time, and is not performed at other times; and
selecting an angle at which the detected reception intensity exceeds a predetermined intensity.

\* \* \* \* \*